May 11, 1937. J. B. EISEN 2,080,255
METHOD OF MAKING CENTER SPOT CROWNS
Filed May 6, 1936
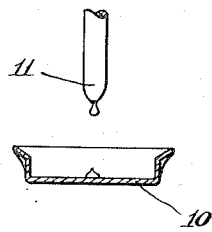
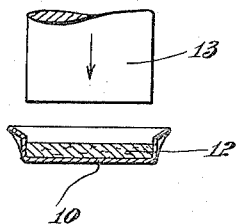
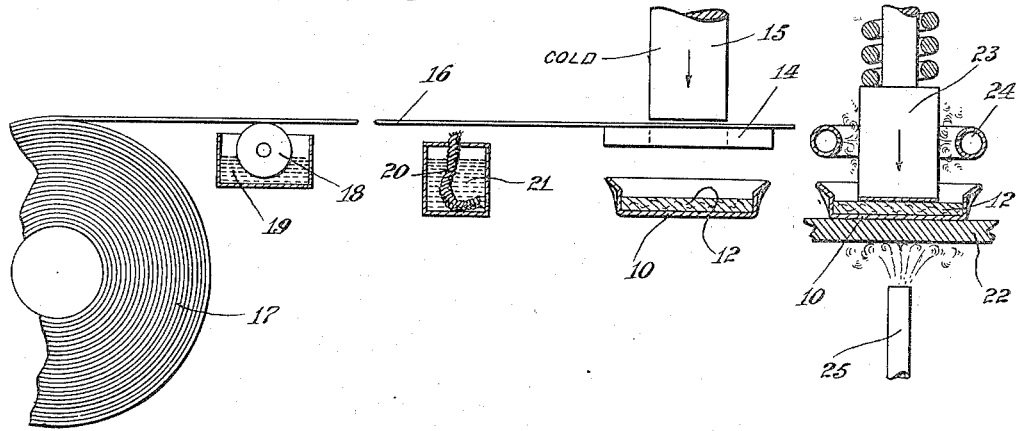
Jay Bernard Eisen
INVENTOR
Frank J. Wentworth
his ATTORNEY Patented May 11, 1937

2,080,255

UNITED STATES PATENT OFFICE 2,080,255

METHOD OF MAKING CENTER SPOT CROWNS

Jay Bernard Eisen, Yonkers, N. Y., assignor to Ferdinand Gutmann & Co., Brooklyn, N. Y., a corporation of New York Application May 6, 1936, Serial No. 78,125

20 Claims. (Cl. 113—80)

The invention relates to the method of making center spot crowns, and more particularly to a method of securing the center spot disc to the cushion disc of a center spot crown of the type shown in the patent to John Alberti, No. 1,199,026 of September 19th 1916.

The commercial production of center spot crowns of the type above referred to has heretofore been impossible. Albuminous adhesives have low viscosity and no inherent adhesiveness until subjected to a temperature at, or above that at which albumen coagulates.

When it is attempted to apply a disc of center spot material to a surface coated with an albuminous adhesive, the disc has a tendency to side slip, so that it is practically impossible to produce such crowns without having a very high percentage of center spots off center in relation to the cushion disc. Furthermore, a lack of inherent tackiness in an albumen adhesive prevents the center spot from being secured to the cushion disc by means of the adhesive with sufficient tenacity to permit the conveyance of the crown with the center spot upon the cushion disc, to the collecting drum in which heat and pressure are simultaneously applied for the purpose of pressing the center spot firmly against the cushion disc, and holding it under pressure during a time interval sufficient to coagulate the albumen and form a permanent bond.

There is also the difficulty that with light adhesion by means of a low viscosity adhesive, even if the center spot be accurately positioned when first deposited upon the adhesive on the cushion disc, the subsequent application of pressure in the heated zone will cause side slipping of the center spot in the manner above referred to, particularly when the pressure must be developed rapidly and must be continued for a period of approximately eight or nine seconds before the albuminous adhesive is coagulated. During this interval and before its final coagulation, the adhesive first becomes tacky so as to form the bond between the center spot and the cushion disc, which bond is made permanent by the final coagulation of the albumen of the adhesive.

It is essential, in the use of albuminous adhesives that they be in the form of an emulsion, since dry albumen cannot be made tacky or coagulated except in the presence of moisture.

While it has heretofore been proposed to coat the strip of material, from which the center spots are cut, with an albuminous adhesive, this procedure is thoroughly impracticable because the presence of the fluid vehicle will cause the fouling of the dies and also because it is practically impossible to maintain a sufficient volume of the adhesive upon the strip to secure an adequate bonding of the center spot to the cushion disc.

By reason of the above difficulties, it has been impossible to develop a machine which will be effectively used in the production of center spot caps in which the center spot is bonded to the cushion disc by means of an albuminous adhesive.

In center spot crowns, the center spot must be substantially concentric with the cushion disc and must be of a diameter to cause the edge of the center spot disc to lap and engage the neck of a bottle to which the crown is applied. While some tolerance is permissible, if the center spot be off center to any substantial extent, a portion of the edge of the spot will pass out of engagement with the neck of a bottle and form a crevice through which gases, with which the beverage is charged, may readily escape, causing what is known as leakers. Consequently, any method which permits side slipping of any substantial percentage of the center spots during application to the cushion disc, is commercially impracticable.

Center spot crowns at the present time are sold to bottlers at prices ranging from twenty-two to thirty-five cents per gross, this price variance resulting from the materials used in the center spots. Oiled paper, varnished kraft or express paper, aluminum foil and tin foil are all extensively used, according to the beverage which is to be bottled, the paper spots being used largely with fruit juices, soft drinks and wines, aluminum foil being used in bottling beer and other malt liquors, and tin foil being used in the bottling of mineral waters and various chemicals.

The material of the center spot is selected with regard to the action of the contents of a bottle thereupon. In other words, the center spot material must be inert so far as the bottle contents are concerned.

An adhesive having an albumen base has been found desirable in securing the cushion discs of crown caps in the metal shells, not only because the albumen may be coagulated at a temperature sufficiently low to minimize likelihood of defacement of the decoration upon a shell, but because while the albumen is readily placed in solution or emulsion in water in forming the adhesive, when it is once coagulated it is water insoluble, so that the bond is not affected by varying weather conditions. This condition also makes the use of albumen adhesive desirable in affixing the center spot to the cushion disc, particularly as albumen, while it is being coagulated, forms a firm bond with the cork of the cushion disc, although it does not readily adhere to the spot material, particularly if the latter be a metal foil.

With the above conditions in mind, I have developed a method of producing center spot crowns by means of an adhesive having an albumen constituent incorporated with another agent or agents permitting the use of albumen in a non-viscous condition so as to avoid those difficulties resulting from slippage of a center spot as it is applied to the cushion disc, or during the subsequent handling of the crown in the production of the finished article.

The method of the invention also allows the adhesive containing albumen to be applied to the strip of facing material in a thin stratum, which stratum, notwithstanding that it is plastic, permits the strip material to be formed in a roll without likelihood under normal temperature conditions, of the adhesive on any convolution sticking to the underlying convolution, and permits the use of dies for cutting discs from the strip at high speeds without the accumulation of adhesive about the die in a manner to interfere with the operation of the machine.

In coating the strip of facing material to secure the above conditions, it is essential that the adhesive be applied thereto while it is in the form of an emulsion or heavy solution, and that the water or other vehicle be evaporated from the adhesive after its application to the stratum, so as to so condition the adhesive as to secure the results above referred to.

In an adhesive so conditioned, the amount of moisture or water of solution or emulsion is not sufficient to permit the albumen content to coagulate when subjected to the usual elevated temperature. Hence, in the practice of the method, it is essential to restore or incorporate in the adhesive coating of the strip, moisture sufficient, when combined with the albumen, to permit the coagulation of the albumen. Another constituent of the adhesive prevents spreading or extrusion of the adhesive from between the center spot and the cushion disc upon the application of pressure to the center spot. This other ingredient, which acts mainly as a carrier for the albumen, is not tacky when wet and undergoes no reactions when subjected to an elevated temperature. It is an inert substance which does not bond readily to cork or form a tenacious bond thereto, and itself is not sufficiently tenacious to form a bond sufficiently effective to withstand the tumbling operation to which crowns are subjected while in the bottling or crowning machine.

I have found it to be desirable to include in the adhesive, in addition to albumen and a plastic carrier therefor, a water soluble adhesive which becomes tacky and sets with the evaporation of the fluid vehicle thereof. The use of this material in the adhesive ensures a firm adhesion of the thin stratum of coating material to the strip of facing material, particularly if this material be a metal foil, and facilitates the admixture of the albumen in the adhesive.

While the plastic carrier will bond itself lightly to either metal foil or paper strips, albumen in the adhesive will not alone form even a light bond with the strip material nor with the cushion disc, since its adhesive properties are developed only upon the application of heat thereto. The use in the compound of an adhesive which becomes tacky by the evaporation of the fluid vehicle is therefore desirable, not only when applying the coating to the strip material, but when applying the center spot to the cushion disc, since the restoration of moisture to the albumen constituent of the adhesive does not make it or its plastic vehicle tacky. Even though the other adhesive in the coating stratum be substantially dry, the restoration of water or other vehicle to the albumen, will be accompanied by the restoration of water or other vehicle to this other adhesive, so that it will become tacky and co-operate with the plastic vehicle in forming an initial bond when first applying the center spot to said cushion disc.

The plastic carrier for the albumen, which sets only when subjected to a temperature of 140° F. or more, or for albumen and a water soluble adhesive which sets as a result of the evaporation of the vehicle itself, is not responsive to heat changes and undergoes no reactions when subjected to heat because of the other ingredients admixed therewith. Nor does this carrier become hard and brittle, or lose its plasticity when confined between the center spot and the cushion disc where oxidation cannot occur. This condition, combined with the tenacity of the bond secured by means of albumen, ensures a highly satisfactory "stick" of the spot to the cushion disc and one which will not deteriorate with ageing of the finished product. In fact, when an adhesive which sets without the application of heat as a result of the evaporation of its vehicle is imbedded in the adhesive compound, the tenacity of the bond increases with the ageing of the crown cap.

With the use of adhesives such as I have described, it is possible, by a continuing operation, to bond the cushion disc in the metal shell of the crown by means of an albuminous adhesive and to apply the center spot to the exposed face of the cushion disc, which procedure has the advantage that it requires but one handling of the constituent parts of the crown, and the subjection of the crown to heat but once, thus minimizing likelihood of the mutilation of the decoration upon the metal shell. The center spot, however, may be applied to the cushion disc of a crown which has been secured to the metal shell by a preceding operation and in a separate machine. Both the above procedures have heretofore been used in the making of center spot crowns.

The invention consists primarily in a method of making center spot crowns consisting of partially emulsifying the albumen in a thin stratum of adhesive containing albumen and a plastic carrier upon a strip of facing material, cutting a center spot from said strip, depositing said spot upon the cushion disc of a crown cap, and thereafter subjecting said center spot to pressure while coagulating the albumen in said adhesive; and in such other novel steps and practices as are hereinafter set forth and described, and more particularly pointed out in the claims hereto appended.

Referring to the drawing,

Fig. 1 is a view showing adhesive being dropped in the metal shell of a cap;

Fig. 2 is a view showing the depositing of a cushion disc upon said adhesive in the metal shell;

Fig. 3 is a view showing the application of moisture to the stratum of adhesive upon a strip of facing material, the cutting of a center spot disc from said strip and the depositing of said disc upon the cushion disc of a crown cap; and Fig. 4 shows the final stage of applying heat and pressure to the center spot disc and the cushion disc for coagulating the albumen in the adhesive stratum.

Like numerals refer to like parts throughout the several views.

In the practice of the method of the invention, I may use either of the procedures above referred to. By the first procedure, a center spot crown may be completely assembled by a continuing operation including the bonding of the cushion disc to the metal shell. By the second procedure, a crown cap may be completely assembled in one machine and the center spot may be applied to the cushion disc of such previously assembled crowns in a second machine, thus dividing the method into two stages as distinguished from the single stage of the first procedure.

In the accompanying drawing, Figs. 1 to 4 are illustrative of the first procedure above referred to, and as to the second procedure, Figs. 1 and 2 are illustrative of the first stage, and Figs. 3 and 4 of the second stage of said procedure.

Referring to the first procedure, I deposit in a metal shell 10, a drop of albuminous adhesive, as by means of a dropper 11 of the type usually employed in assembling machines in which albumen is used for adhering the cushion disc to the metal shell. After the adhesive is applied to the metal shell, a cushion disc 12 of natural or composition cork or other usual materials is deposited within the shell by means of a plunger 13 which shows conventionally the usual cork feeding mechanism of assembling machines. After having the cushion disc 12 deposited therein, the crowns are brought into the operative relation to a die 14 co-operating with which is a plunger die 15. A strip 16 of facing material is fed across the die 14, the strip being drawn from a roll 17.

The under side of this strip is coated with the solid constituents of an adhesive from which the vehicle or the water of solution has been evaporated to an extent to bring the adhesive to a substantially dry condition, or to a condition wherein the constituents are non-tacky, so that succeeding convolutions of the strip in the roll 17 will not adhere, one to the other, due to weather conditions or elevated temperatures.

The surface coating upon the strip 16 contains albumen from which the water of emulsion has been evaporated, and a plastic carrier therefor which prevents the albumen from becoming brittle and keeps the strip in condition to permit the cutting of discs therefrom by the dies 14 and 15. The latex will serve to adhere the albumen to the material of the strip proper. This strip may be of treated paper, aluminum foil or tin foil, according to the beverages in the bottling of which the crowns are used. Latex does not adhere tenaciously to metal foils, and when such are used, I preferably include in the adhesive, casein or other material which becomes tacky and sets as a result of the evaporation of its vehicle.

By the inclusion of casein or its equivalent, the albumen and its plastic carrier latex may be firmly bonded to the material of the strip 16 during the evaporation of the fluid of emulsion used in coating the strip. Albumen in emulsion is not tacky, and prior to my invention it has been impossible to coat strip material for making center spot caps with an albuminous emulsion and evaporate the moisture therefrom and still have the albumen adhere to the strip.

In the presence of a plastic carrier, the water of emulsion may be removed from an albuminous adhesive, and the substantially dry albumen may be retained upon the strip. By the addition of casein or its equivalent in the emulsion, a tenacious bond may be secured between the coating and the material of the strip, so that when the albumen is finally coagulated to form a bond with the material of the cushion disc 12, and while the disc is being cut from the strip 16 and applied to the cushion disc, the coating is already firmly bonded to the material of the strip.

In the practice of the invention, I have found that a coating material containing in a dry or plastic form the following ingredients, has given highly satisfactory results:—

Substantially twenty-seven parts of latex; substantially nine parts of casein; substantially two parts of lime and from eight to sixteen parts of albumen. The above proportions are by weight of the solids in the coating.

While I have increased the albumen content of the coating, I have found that if albumen in excess of sixteen parts be incorporated therein, no advantageous results are secured, although with a higher percentage of albumen a satisfactory stick can be secured.

The amount of water or other solvent used in forming the solution or emulsion is determined by the procedure followed in coating the strip material, but since this water or other solvent is evaporated from the adhesive during the coating operation, the amount thereof or the viscosity of the adhesives used in coating the strip are immaterial to the present invention. The amount of water by weight, however, which I have used is slightly greater than the weight of the solid constituents of the emulsion, but may be varied according to the procedure followed and the machine used in the coating operation.

The coating of the strip 16 may vary from one to two thousandths of an inch in thickness, being a thin coating, which is desirable, as will hereinafter appear, to permit the re-incorporation in the adhesive of sufficient moisture to make the casein slightly tacky and provide sufficient water to ensure the ultimate coagulation of the albumen.

Before cutting the center spot from the strip 16, it is necessary to restore to the coating upon the under face of this strip as it is being fed in relation to the dies 14 and 15, moisture sufficient to so condition the albumen in the coating as to afford a volume adequate to permit the subsequent coagulation of the albumen in the final step of applying the center spot to the cushion disc. In thus incorporating moisture in the adhesive for the purpose stated, care must be exercised to avoid the application of sufficient moisture to make the surface of the coating "slimy". When casein is included in the coating, some of the moisture applied to the coating will be absorbed by the casein, and some of this moisture will also combine with the latex or be so associated therewith as to soften the latex slightly so that when a disc is cut from the strip and pressed upon the cushion disc by the plunger die 15, it will adhere to the disc with sufficient tenacity to ensure a proper emplacement of the disc and against its displacement as the crown is being conveyed from the cutting dies to the heat and pressure mechanism of the machine.

If excessive water or other moistening agent be applied to the coating upon the strip, there is a tendency toward side slippage of the center spot disc as it is applied to the cushion disc.

In applying the moisture to the coating, it is desirable to afford a time interval between the application of moisture thereto and the cutting of the center spot discs from the strip, to ensure the penetration of the coating by the moisture and avoid the absence of excess surface moisture imparting sliminess to the coating.

In actual practice, I have allowed several seconds time following the application of moisture to the coating to permit the diffusion of this moisture throughout the coating, and immediately prior to the strip passing to the dies, have subjected the coating to a water vapor to compensate for any loss of surface moisture during the travel of the strip following the application of moisture thereto. The previously absorbed moisture seems to facilitate the diffusion of the vapor about the surface of the coating, and this vapor apparently facilitates the making of the initial bond between the center spot disc and the cushion disc.

In the accompanying drawing, I have shown the initial application of moisture as being by means of a wetting roller 18 immersed in a tank 19 of water. The source of the vapor in the drawing is shown as consisting of a capillary wick 20 extending into the fluid contained in a tank 21. By subjecting the coating upon the strip to the moistening action of the roller 18 and then, after a short interval of possibly three seconds, again subjecting this coating to vapors from the fluid within the tank 21, the coating seems to be so conditioned that the latex and the casein toward the surface of the coating will readily adhere to the cushion disc 12, even upon the application of a very slight pressure exerted by the plunger die 15. The albumen does not contribute toward the initial bonding of the center spot to the cushion disc.

After the center spot has been applied to the cushion disc, the crown with the center spot lightly adhering to said cushion disc is brought between a plate 22 and a heated spring pressed plunger 23 in the collecting drum. In the drawing, a conventional form of heater 24 adjacent the plunger 23 is shown. Below the plate 22 a second conventional form of heater 25 is shown.

When a center spot crown in its entirety is to be assembled by a continuing operation of a single machine, the heater 25 is used. When the shell 10 and the cushion disc 12 are assembled in a separate machine from that in which the center spot is applied to the cushion disc, no heater 25 is used, since the cork of the cushion disc is a sufficiently good heat insulator to preclude the utilization of heat from said heating device in coagulating the albumen in the final step of the method.

The assembled crown is held under pressure and subjected to heat for a sufficient interval to bring the adhesive stratum between the center spot and the cushion disc to a temperature of 140° F. or more, so as to coagulate the albumen and form a permanent bond.

Machines commonly in use in assembling crown caps are so constructed as to afford a dwell of from eight to nine seconds in the collecting drum. The heat developed in the plunger 23 and the plate 22, when a heated plate is used, must be such as to bring the albumen to the coagulating temperature while pressure is applied to the center spot by the plunger 23, and the pressure may be continued for a slightly greater interval to permit a partial cooling of the adhesive after the albumen has been coagulated and set, although such cooling is not necessary.

The coating upon the facing strip 16, even when moistened in the manner described, is sufficiently plastic to avoid any possibility of the extrusion thereof upon the application of pressure either by the plunger die 15 or the heated plunger 23. Likelihood of such extrusion is also reduced to a minimum by the use of a very thin coating of adhesive. Such a thin coating also facilitates the penetration of moisture throughout the entire thickness of the coating, so that as the albuminous constituent is coagulated and sets, it will form a permanent bond between the cushion disc 12 and the material of the strip 16. This bond is assisted by the casein in the coating and by the plastic carrier for the albumen of the casein. The coagulated albumen and dry casein will have greater cohesion than the latex. The latter undergoes no reactions by reason of the application of heat and pressure in the manner described, although some of the moisture applied thereto may be driven off by said heat as to the latex and the casein, particularly about the edge of the center spot where a particularly firm bond is desirable. The latex will lose little of its plasticity even after a long aging period, since air is excluded therefrom except at the extreme edge of the center spot disc.

The plunger die 15 is a cold die.

The presser plunger 23 may be brought to a temperature well in excess of 140° F. in order to effect a rapid transfer of heat to the albumen in bringing it to the coagulating temperature. A higher temperature is required when the center spot disc is of treated paper than when it is of metal foil, since paper is a poor conductor of heat. A higher temperature, when paper spots are being applied, permits the machine to operate at its usual speed.

With treated paper, casein may be omitted from the adhesive if desired, although I have found its presence in the adhesive facilitates the incorportion therein of albumen.

It is not my intention to limit the amount of solid constituents in the adhesive to the exact proportions herein stated, since such are capable of a considerable range of variation and still give highly satisfactory results. The proportions given, however, are the best I have yet found.

The only constituent in the coating which undergoes any reactions by reason of the application of heat is the albumen. When this is coagulated it becomes insoluble, so that the bond secured is not subject to deterioration by changing weather conditions.

Under no circumstances will the coating upon the strip 16 become sufficiently viscous to permit side slipping of the center spot disc or the extrusion of any portion of the coating when pressure is applied in the manner described. If any of the adhesive should, however, escape beyond the edge of the center spot disc, the plastic carrier will prevent crystallization thereof and granulation as the crowns are being tumbled in the feed hopper of the bottling or crowning machine. The presence of latex also ensures a high measure of flexibility throughout the center spot cap, thus assisting in the formation of a gas and liquid proof seal about the neck of a bottle, since the pressures applied to the crown during the bottling or crowning operation will readily deform the facing disc about the edge thereof without the breaking down of the bond between the center spot and the cushion disc. Furthermore, after the coagulation of the albumen, the coating of adhesive again becomes substantially dry without destroying the plasticity of the latex or other carrier. It is possible that the latex takes up some moisture from the casein and albumen.

The latex used is a pure latex without any vulcanizing medium, so that it is not affected by heat except insofar as heat may drive off water absorbed thereby.

The essential characteristics of the method are, the use of a strip of facing material, from which center spot discs are cut, having a thin coating on one face thereof of the solid constituents of an adhesive containing latex and albumen, or latex, casein and albumen from which the water of solution or emulsion has been evaporated; the partial saturation of these dry constituents by the application of a water or other solvent to the coating immediately prior to the cutting of a center spot disc therefrom; the pressing of a center spot disc upon the cushion disc within a metal shell, and the coagulation of the albumen while subjecting the center spot disc to pressure. Only a momentary pressure is developed when initially applying the center spot disc to the cushion disc. A continuing pressure is used while the albumen is being coagulated.

While coagulating agents may be applied to the coating when partially saturating same, I prefer to follow the usual practices in securing cushion discs to metal shells and effect the coagulation of the albumen constituent by means of heat, since this also drives off moisture from the casein constituent when such is used.

The plasticity of the latex constituent of the coating not only prevents side slipping upon the initial application of the center spot to the cushion disc, but will cause the center spot disc to adhere to the cushion disc sufficiently to prevent displacement of the disc while the crown is being transported to the collecting drum or other mechanism in which the albumen is coagulated while being subjected to pressure. In the final stage, the evaporation of the moisture from the casein, when used, and the coagulation of the albumen will form an effective anchorage firmly adherent to the cushion disc, for all of the constituents of the coating including the latex. The coagulated albumen and the solidified casein throughout the adhesive stratum between the center spot disc and the cushion disc increase the tenacity of the bond throughout.

It is not my intention to limit the invention to the exact proportions of the solid constituents of the adhesive coated upon the strip of facing material, nor to the time intervals, pressure poundage or temperatures herein stated.

In actual practice, the initial pressure may be measured in ounces. The continuing pressure in machines in which I have used the method is between fourteen and fifteen pounds. The pressure is applied throughout the entire area of the cushion disc. During the initial pressure, the greatest pressure is about the edge of the cushion disc, because of the slight cupping of the top of the shell. Plungers, having semi-spherical ends conforming to the cupping of the top of this metal shell, are used when applying the continuing pressure. These, however, are mere matters of mechanical detail which may be varied to secure a desired application of pressure throughout the entire area of the center spot disc.

Having described the invention, what I claim as new and desire to have protected by Letters Patent, is:—

1. A method of making center spot crowns consisting of partially emulsifying the albumen in a thin stratum of adhesive containing albumen and a plastic carrier upon a strip of facing material, cutting a center spot from said strip, depositing said spot upon the cushion disc of a crown cap, and thereafter subjecting said center spot to pressure while coagulating the albumen in said adhesive.

2. A method of making center spot crowns consisting of partially emulsifying the albumen in a thin stratum of adhesive containing albumen and a plastic carrier upon a strip of facing material, cutting a center spot from said strip, depositing said spot upon the cushion disc of a crown cap, and thereafter subjecting said center spot to pressure and heat sufficient to coagulate the albumen in said adhesive.

3. A method of making center spot crowns consisting of partially emulsifying the albumen in a thin stratum of adhesive containing albumen and latex upon a strip of facing material, cutting a center spot from said strip, depositing said spot upon the cushion disc of a crown cap, and thereafter subjecting said center spot to pressure while coagulating the albumen in said adhesive.

4. A method of making center spot crowns consisting of partially emulsifying the albumen in a thin stratum of adhesive containing albumen and latex upon a strip of facing material, cutting a center spot from said strip, depositing said spot upon the cushion disc of a crown cap, and thereafter subjecting said center spot to pressure and heat sufficient to coagulate the albumen in said adhesive.

5. A method of making center spot crowns consisting of partially emulsifying the albumen in a thin stratum of adhesive containing casein, albumen and a plastic carrier upon a strip of facing material, cutting a center spot from said strip, depositing said spot upon the cushion disc of a crown cap, and thereafter subjecting said center spot to pressure while coagulating the albumen in said adhesive.

6. A method of making center spot crowns consisting of partially emulsifying the albumen in a thin stratum of adhesive containing casein, albumen and a plastic carrier upon a strip of facing material, cutting a center spot from said strip, depositing said spot upon the cushion disc of a crown cap, and thereafter subjecting said center spot to pressure and heat sufficient to coagulate the albumen in said adhesive.

7. A method of making center spot crowns consisting of partially emulsifying the albumen in a thin stratum of adhesive containing casein, albumen and latex upon a strip of facing material, cutting a center spot from said strip, depositing said spot upon the cushion disc of a crown cap, and thereafter subjecting said center spot to pressure while coagulating the albumen in said adhesive.

8. A method of making center spot crowns consisting of partially emulsifying the albumen in a thin stratum of adhesive containing casein, albumen and latex upon a strip of facing material, cutting a center spot from said strip, depositing said spot upon the cushion disc of a crown cap, and thereafter subjecting said center spot to pressure and heat sufficient to coagulate the albumen in said adhesive.

9. A method of making center spot crowns consisting of applying liquid to a thin stratum of adhesive containing albumen and a plastic carrier upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure while coagulating the albumen in said adhesive.

10. A method of making center spot crowns consisting of applying liquid to a thin stratum of adhesive containing albumen and a plastic carrier upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure and heat sufficient to coagulate the albumen in said adhesive.

11. A method of making center spot crowns consisting of applying liquid to a thin stratum of adhesive containing albumen and latex upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure while coagulating the albumen in said adhesive.

12. A method of making center spot crowns consisting of applying liquid to a thin stratum of adhesive containing albumen and latex upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure and heat sufficient to coagulate the albumen in said adhesive.

13. A method of making center spot crowns consisting of applying liquid to a thin stratum of adhesive containing casein, albumen and a plastic carrier upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure while coagulating the albumen in said adhesive.

14. A method of making center spot crowns consisting of applying liquid to a thin stratum of adhesive containing casein, albumen and a plastic carrier upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure and heat sufficient to coagulate the albumen in said adhesive.

15. A method of making center spot crowns consisting of applying liquid to a thin stratum of adhesive containing casein, albumen and latex upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure while coagulating the albumen in said adhesive.

16. A method of making center spot crowns consisting of applying liquid to a thin stratum of adhesive containing casein, albumen and latex upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure and heat sufficient to coagulate the albumen in said adhesive.

17. A method of making center spot crowns consisting of depositing an albuminous emulsion in a metal shell, placing a cushion disc within the shell upon said emulsion, partially emulsifying the albumen in a thin stratum of adhesive containing albumen and latex upon a strip of facing material, cutting a center spot from said strip, depositing said spot upon the cushion disc of a crown cap, and thereafter subjecting said center spot to pressure and heat sufficient to coagulate the albumen in said adhesive and said emulsion.

18. A method of making center spot crowns consisting of depositing an albuminous emulsion in a metal shell, placing a cushion disc within the shell upon said emulsion, applying liquid to a thin stratum of adhesive containing albumen and latex upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure and heat sufficient to coagulate the albumen in said adhesive and said emulsion.

19. A method of making center spot crowns consisting of depositing an albuminous emulsion in a metal shell, placing a cushion disc within the shell upon said emulsion, applying liquid to a thin stratum of adhesive containing casein, albumen and latex upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure and heat sufficient to coagulate the albumen in said adhesive and said emulsion.

20. A method of making center spot crowns consisting of applying liquid to a thin stratum of adhesive containing nine parts of casein, albumen within a range of from eight to sixteen parts, two parts of line and twenty-seven parts of latex upon a strip of facing material, thereafter subjecting said adhesive to a vapor, cutting a center spot from said strip immediately after subjecting said adhesive to said vapor, depositing said spot upon the cushion disc of a crown cap, and thereafter subjecting said center spot to pressure and heat sufficient to coagulate the albumen in said adhesive.

JAY BERNARD EISEN.